United States Patent
Siemensmeyer et al.

(10) Patent No.: US 6,800,337 B1
(45) Date of Patent: Oct. 5, 2004

(54) THERMAL INSULATING COATING

(75) Inventors: Karl Siemensmeyer, Frankenthal (DE);
Peter Schuhmacher, Mannheim (DE);
Frank Meyer, Mannheim (DE);
Norbert Schneider, Altrip (DE);
Hiroki Ishida, Neustadt (DE)

(73) Assignee: BASF Aktiengesellschaft, Ludwigshafen (DE)

( * ) Notice: Subject to any disclaimer, the term of this patent is extended or adjusted under 35 U.S.C. 154(b) by 0 days.

(21) Appl. No.: 09/509,548

(22) PCT Filed: Oct. 14, 1998

(86) PCT No.: PCT/EP98/06527

§ 371 (c)(1),
(2), (4) Date: Apr. 12, 2000

(87) PCT Pub. No.: WO99/19267

PCT Pub. Date: Apr. 22, 1999

(30) Foreign Application Priority Data

Oct. 15, 1997 (DE) .......................... 197 45 647

(51) Int. Cl.$^7$ .............................. C09K 19/02
(52) U.S. Cl. .................. 428/1.1; 428/1.2; 252/299.01
(58) Field of Search .............. 428/1.1, 1.2; 252/299.01

(56) References Cited

U.S. PATENT DOCUMENTS

| 4,637,896 A | 1/1987 | Shannon |
| 5,352,312 A | 10/1994 | Guillot |
| 5,629,055 A | 5/1997 | Revol et al. |

FOREIGN PATENT DOCUMENTS

| GB | 2132623 A | * 10/1982 | ............ C09K/3/34 |
| JP | 4-281403 | * 10/1992 | ............ G02B/5/26 |

OTHER PUBLICATIONS

Merriam–Webster's Collegiate Dictionary, 10$^{th}$ ed. Merriam–Webster, Incorporated, Springfield: 1999, p. 587.*

F. Reinitzer, Monatshefte Chemie, vol. 9, pps. 421–441, "Beitraege Zur Kenntniss Des Cholesterins" 1888.

* cited by examiner

Primary Examiner—James J. Seidleck
Assistant Examiner—Melanie Bissett
(74) Attorney, Agent, or Firm—Oblon, Spivak, McClelland, Maier & Neustadt, P.C.

(57) ABSTRACT

The invention relates to a heat-insulating coating which comprises one or more cholesteric IR-reflecting layers and to processes for its preparation and to its use.

17 Claims, No Drawings

THERMAL INSULATING COATING

The invention relates to a heat-insulating coating which comprises one or more cholesteric IR-reflecting layers.

The problem of screening against thermal radiation is important in particular in connection with the insulation of residential, office or industrial buildings. Buildings with a generous expanse of windows heat up rapidly, especially in summer and in southerly regions in particular, to such an extent that they have to be cooled at considerable energy cost by air conditioning units.

Common techniques of heat insulation, especially for screening against thermal radiation in the wavelength range between 800 nm and 2000 nm, are based on the absorption of the radiation by appropriate dyes or pigments. However, a large part of the energy absorbed is passed on by conduction to the area or item which is to be insulated.

The use of materials which substantially reflect thermal radiation is also known.

For this purpose there is widespread use of special dyes or pigments, but also graphite or gold, as broadband absorbers or reflectors.

Examples of dyes employed in this context are naphthalocyanines having broadband absorption in the infrared (IR), or else laked polymethine dyes. However, a serious disadvantage of the IR-absorbing dyes is that they exhibit marked absorption in the visible wavelength range as well, with the result that a considerable reduction in transparency is observed. The radiative energy absorbed is transformed into thermal energy which is dissipated by conduction.

Graphite, gold, silver or indium-tin oxide (ITO), which are also employed as absorbers or reflectors for IR radiation, have comparable disadvantages. Here too, especially in the visible region of the spectrum, there is very little transparency. Only highly precise and hence extensive production of extremely thin layers ensures a sufficiently uniform and high level of transmission in the visible wavelength range. Metal layers of this kind are generally applied by chemical or physical vapor deposition techniques (CVD or PVD), which are highly complex.

It is likewise known that cholesteric liquid-crystalline substances are also able to reflect light in the IR region of the electromagnetic spectrum. Cholesteric (chiral nematic) liquid crystals have already long been known. The first example of such a material was discovered by the Austrian botanist F. Reinitzer (Monatshefte Chemie, 9 (1888), 421). It is the chirality which determines the existence of cholesteric phases. The chiral moiety can either be present in the liquid-crystalline molecule itself or can be added as a dopant to the nematic phase, thereby inducing the chiral nematic phase. The chiral nematic phase has special optical properties: a high optical rotation and a pronounced circular dichroism resulting from selective reflection of circularly polarized light within the nematic layer. A consequence of this is that not more than 50% of the incident light having the reflection wavelength is reflected. The remainder passes through without interacting with the medium. The direction of rotation of the reflected light is determined by the handedness of the helix: a right-handed helix reflects right-circularly polarized light, a left-handed helix left-circularly polarized light. By altering the concentration of a chiral dopant it is possible to vary the pitch and hence the wavelength range of selectively reflected light of a chiral nematic layer. There is a direct relationship here between the reciprocal of the observed pitch p and the concentration of the chiral compound ($x_{ch}$):

$$1/p = HTP \, x_{ch}$$

where HTP denotes the helical twisting power of the chiral dopant.

U.S. Pat. No. 4,637,896 discloses cholesteric liquid-crystalline compounds, based on cholesterol derivatives, and photopolymerized cholesteric coatings which comprise these compounds in copolymerized form. The cholesteric films described have reflection maxima which are predominantly within the visible wavelength range. However, two examples are also given of colorless films whose reflection maxima lie at 950 and 1260 nm respectively. Owing to the narrow breadth of reflection, however, these films are not suitable as a heat-insulating coating.

U.S. Pat. No. 5,629,055 discloses solid cholesteric films based on cellulose. The films are obtainable from colloid suspensions of cellulose crystallites, said colloid suspensions being prepared by acidic hydrolysis of crystalline cellulose. The solid films have cholesteric properties and their reflection wavelength is said to be adjustable over the entire spectral range from infrared to ultraviolet. The materials described are proposed in particular for use as optical authentification materials, since printing or photocopying techniques are unable to reproduce the cholesteric effect.

U.S. Pat. No. 5,352,312 describes a method of insulating rocket engines against heat and corrosives. The method comprises the use of an ablative insulating material which comprises a thermoplastic liquid-crystalline polymer. The liquid-crystalline material, however, is not cholesteric and the insulating action is based on the ablative effect and not on the reflection of thermal radiation.

U.S. Pat. No. 5,016,985 discloses an infrared filter comprising a broadband infrared filter element and a cholesteric liquid-crystalline filter element. The significance of the cholesteric filter element lies in particular in its ability to block infrared wavelengths in a precise, narrow band. The infrared filter can be used, for example, in night vision equipment.

It is an object of the present invention to provide heat insulation media which are easy to prepare, which are almost completely transparent in the visible range of the electromagnetic spectrum and which absorb very little in the near infrared and in the visible wavelength range of the electromagnetic spectrum.

We have found that this object is achieved by coatings which comprise at least one cholesteric IR-reflecting layer.

The present invention therefore provides a heat-insulating coating comprising one or more cholesteric layers and reflecting at least 40%, in particular at least 45%, of the incident radiation in the infrared wavelength range, preferably above 750 nm and, in particular, in the wavelength range from 751 nm to about 2000 nm.

The heat-insulating coating of the invention has a series of surprising advantages:

a) incident radiation in the visible wavelength range is transmitted almost completely, so that the coating appears transparent.
b) Incident light in the infrared region of the electromagnetic spectrum is very largely reflected and not absorbed, so that the object to be insulated does not heat up through conduction.
c) There is broadband reflection of incident thermal radiation, allowing the efficient insulation of articles.
d) The thickness and uniformity of the coating can be varied within a wide range without significantly effecting its insulating properties, with the result that its preparation is considerably less complex than that, for example, of metal-containing reflective coatings.

e) The use of ecologically and toxicologically objectionable metals is avoided.

f) The starting compounds for preparing the coating are readily available industrially; their use is thus generally less expensive than that of, say, gold or silver in reflective coatings.

The heat-insulating coating of the invention preferably transmits at least 80%, in particular at least 90%, of the incident radiation in the wavelength range of visible light, i e. approximately in the range from 390 nm to 750 nm.

Particular preference is given to a heat-insulating coating of the invention which comprises two or more, preferably from about 2 to 20 and, in particular, about 2 to 10 cholesteric IR-reflecting layers. With particular preference the layers have different reflection maxima in the wavelength range >750 nm. With very particular preference the heat-insulating coating of the invention comprises two or more cholesteric layers, preferably a number of cholesteric layers which can be divided by 2, such as 2, 4, 6, 8 or 10, the pitch of the helical superstructures of 2—preferably adjacent—layers in each case being identical but their handedness being different. Very particular preference is likewise given to a heat-insulating coating of the invention which between layers having a helical superstructure of identical pitch and identical handedness has a medium which reverses the direction of rotation of the transmitted circularly polarized light, especially what is known as a $\lambda/2$ film or plate.

The use of layers of different handedness, or of a medium which reverses the direction of rotation of the transmitted circularly polarized light between layers of identical handedness, is able to increase considerably the reflection of the heat-insulating coating of the invention. In this way degrees of reflection of at least 75%, in particular at least 85%, based on the incident radiation are achieved preferably, in the wavelength range above 750 nm, in particular in the wavelength range from 751 nm to about 2000 nm.

The only restriction on the composition of the heat-insulating coating of the invention is that it must include compounds which, alone or through their interaction, give it cholesteric IR-reflecting properties. In principle, virtually all known cholesteric monomers or monomer mixtures or polymers or polymer mixtures can be adjusted in the pitch of their helical superstructure, by varying the chiral component,din such a way that their reflection maximum lies within the IR.

A preferred heat-insulating coating of the invention can comprise, for example, in the cured state cholesteric compounds or mixtures of compounds selected from a) at least one cholesteric polymerizable monomer;

b) at least one achiral, nematic, polymerizable monomer and a chiral compound;

c) at least one cholesteric crosslinkable polymer;

d) at least one cholesteric polymer in a polymerizable diluent or a mixture of polymerizable diluents;

e) at least one cholesteric polymer whose cholesteric phase can be frozen in by rapid cooling to below the glass transition temperature; or f) at least one achiral, liquid-crystalline crosslinkable polymer and a chiral compound.

For the purposes of the present invention, crosslinking means the covalent linking of polymeric compounds and polymerization means the covalent linking of monomeric compounds to form polymers. By curing is meant crosslinking, polymerization or the freezing-in of the cholesteric phase.

Curing fixes the uniform orientation of the cholesteric molecules in the cholesteric layer.

Preferred monomers of group a) are described in DE-A-196 02 848 and in DE-A-4 342 280, the full content of which is incorporated herein by reference. In particular, the monomers a) comprise at least one chiral, liquid-crystalline, polymerizable monomer of the formula I $$[Z^1—Y^1—A^1—Y^2—M^1—Y^3—]_nX \qquad (I)$$

where $Z^1$ is a polymerizable group or a radical which carries a polymerizable group, $Y^1$, $Y^2$, $Y^3$ independently are chemical bonds, oxygen, sulfur,

—CO—O—, —O—CO—, —O—CO—O—,

—CO—S—, —S—CO—

—CO—N(R)—, —N(R)—CO—, $CH_2O$ or $OCH_2$, $A^1$ is a spacer, $M^1$ is a mesogenic group, X is an n-valent chiral radical, R is hydrogen or $C_1$–$C_4$-alkyl, n is 1 to 6 and the radicals $Z^1$, $Y^1$, $Y^2$, $Y^3$, $A^1$ and $M^1$ can be identical or different if n is greater than 1.

Preferred radicals $Z^1$ are:

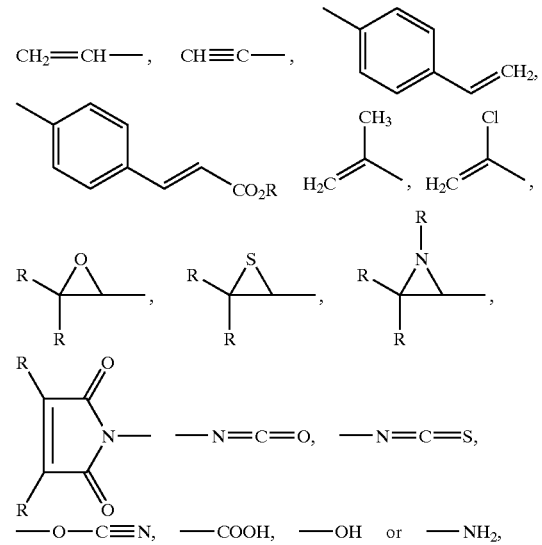

where each R can be identical or different and is hydrogen or $C_1$–$C_4$-alkyl, such as methyl, ethyl, n-propyl, isopropyl, n-butyl, isobutyl, sec-butyl or tert-butyl. Of the reactive polymerizable groups, the cyanates are able to trimerize spontaneously to cyanurates and are therefore preferred. Polymerization of the other groups indicated requires further compounds having complementary reactive groups. Isocyanates, for example, are able to polymerize with alcohols to give urethanes and with amines to give urea derivatives. Similar comments apply to thiiranes and aziridines. Carboxyl groups can be condensed to give polyesters and polyamides. The maleimido group is particularly suitable for free-radical copolymerization with olefinic compounds such as styrene. Said complementary reactive groups can be present either in a second compound of the invention, which is mixed with the first, or can be incorporated into the polymeric network by means of auxiliary compounds containing 2 or more such complementary groups.

Particularly preferred groups $Z^1$–$Y^1$ are acrylate and methacrylate.

$Y^1$–$Y^3$ can be as defined above, the term chemical bond meaning a single covalent bond.

Suitable spacers $A^1$ are all groups known for this purpose. The spacers contain generally from 2 to 30, preferably from 2 to 12 carbon atoms and consist of linear aliphatic groups. They may be interrupted in the chain by nonadjacent O, S, NH or NCH$_3$, for example. Other suitable substituents for the spacer chain are fluorine, chlorine, bromine, cyano, methyl and ethyl.

Examples of representative spacers are:

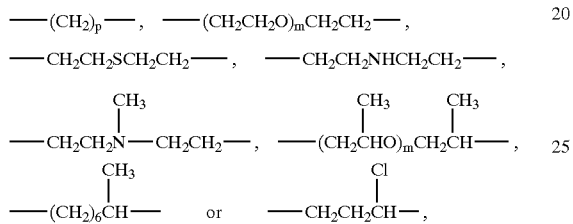

where m is 1 to 3 and p is 1 to 12.

The mesogenic group ml preferably has the structure

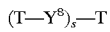

where $Y^8$ is a bridge in accordance with one of the definitions of $Y^1$, s is 1 to 3 and T is identical or different at each occurrence and is a divalent isocycloaliphatic, heterocycloaliphatic, isoaromatic or heteroaromatic radical. If s is >1, the bridges $Y^8$ can be identical or different.

The radicals T can also be ring systems substituted by $C_1$–$C_4$-alkyl, $C_1$–$C_4$-alkoxy, fluorine, chlorine, bromine, cyano, hydroxyl or nitro. Preferred radicals T are:

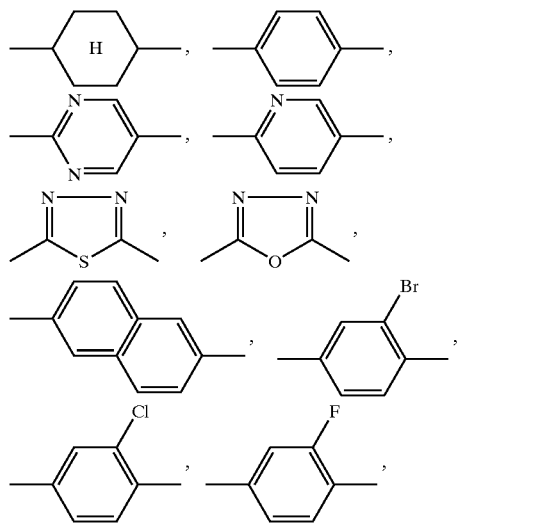

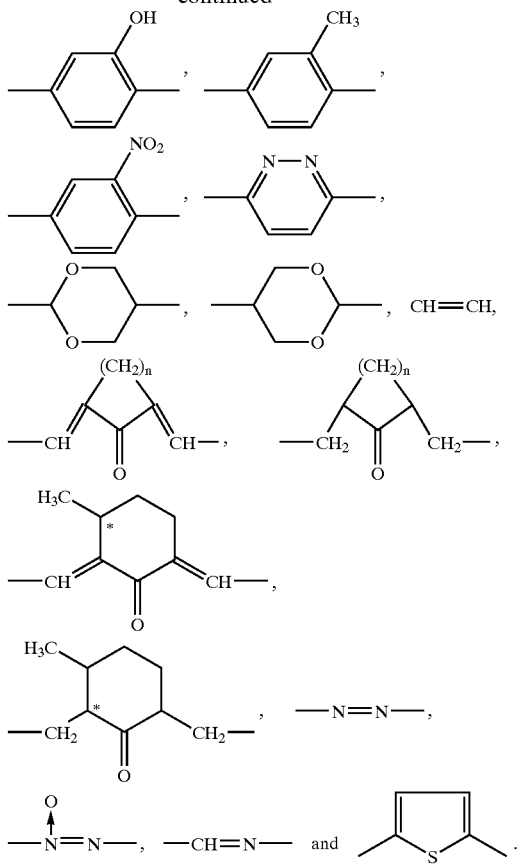

Particular preference is given to the following mesogenic groups $M^1$:

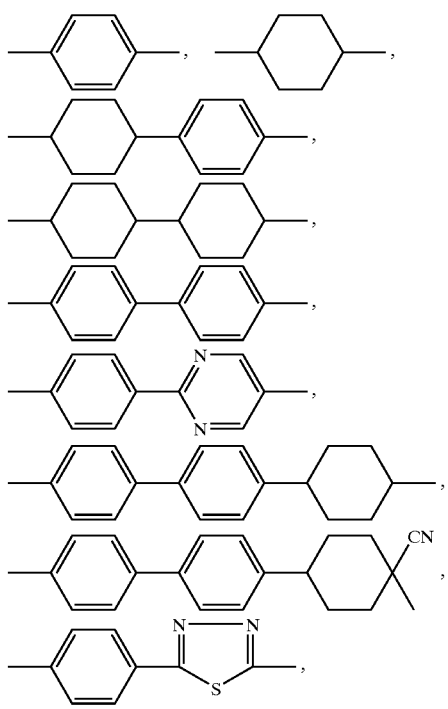

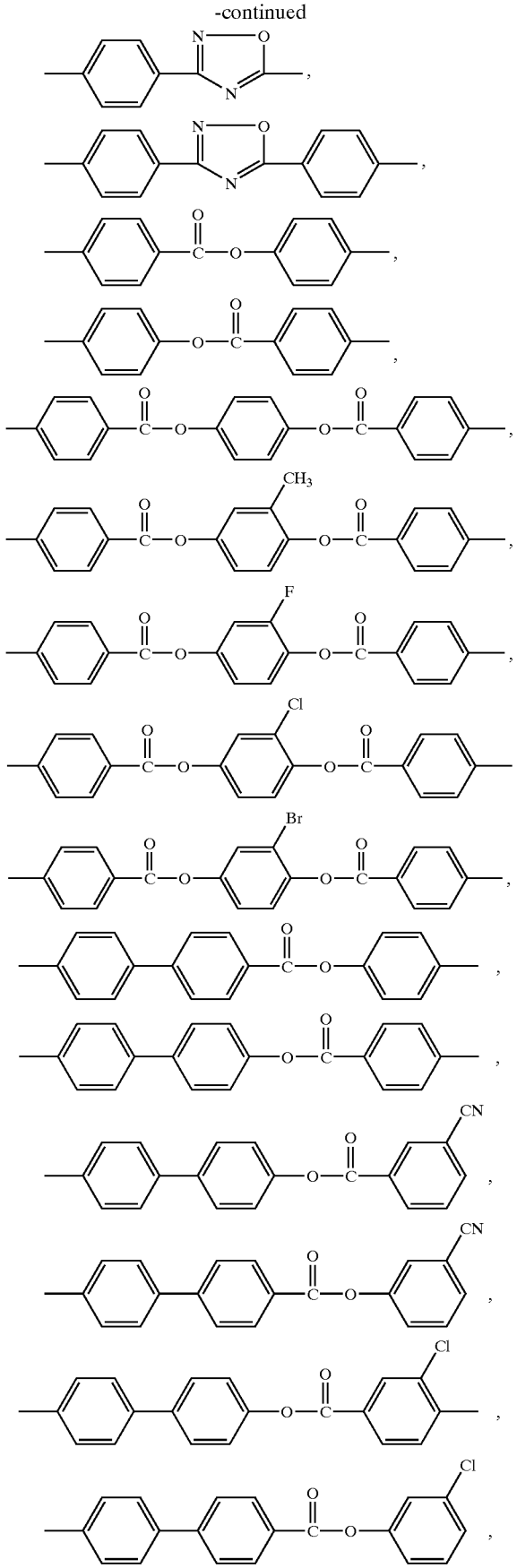

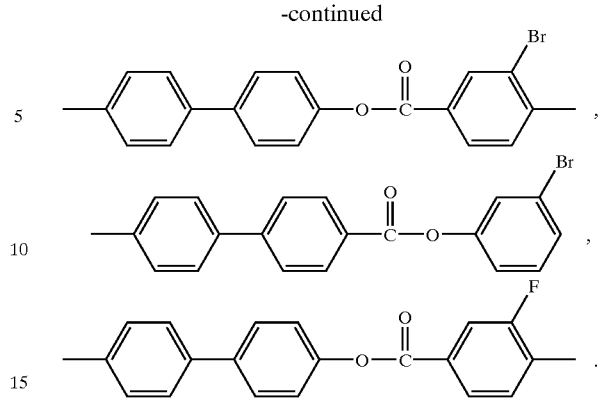

Of the chiral radicals X of the compounds of the formula I particular preference is given, not least on account of their availability, to those derived from sugars, from binaphthyl or biphenyl derivatives and from optically active glycols, dialcohols or amino acids. In the case of the sugars, particular mention should be made of pentoses and hexoses and derivatives thereof.

Examples of radicals X are the following structures, the lines at the end in each case denoting the free valences.

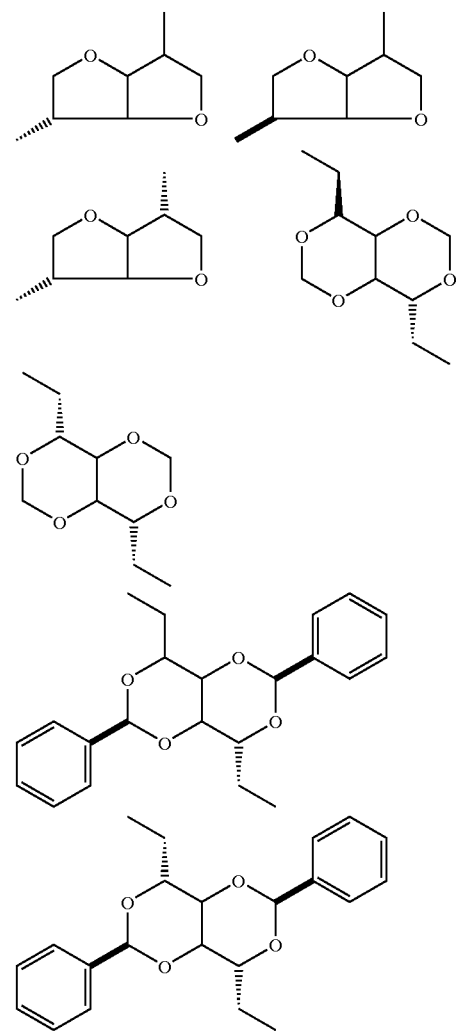

-continued
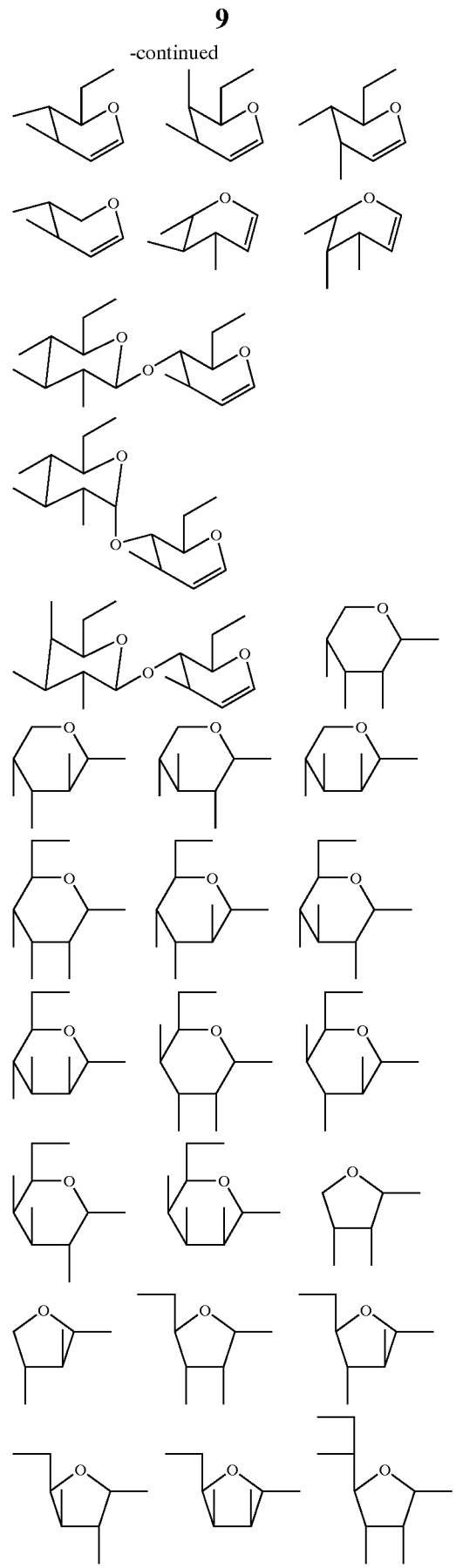
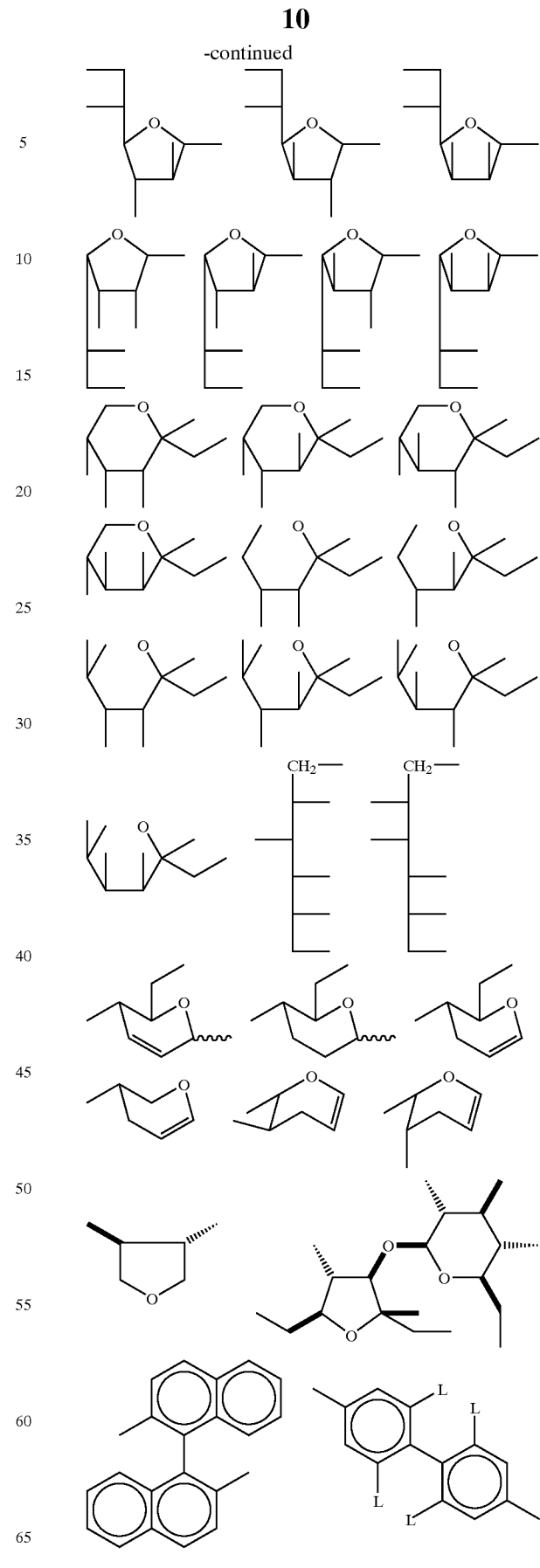

Particular preference is given to

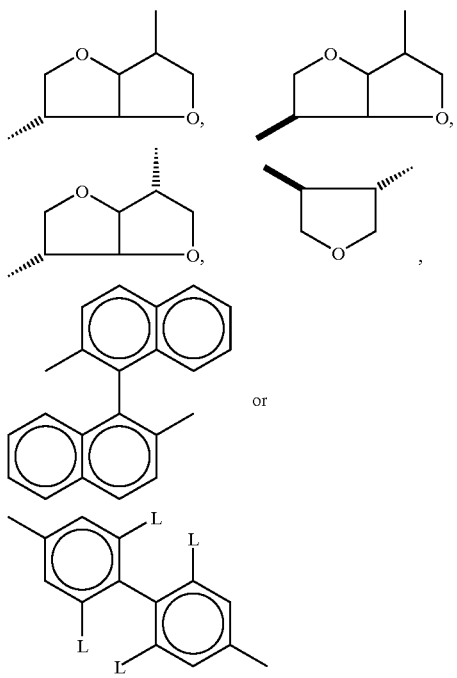

or

Also suitable, furthermore, are chiral groups having the following structures:

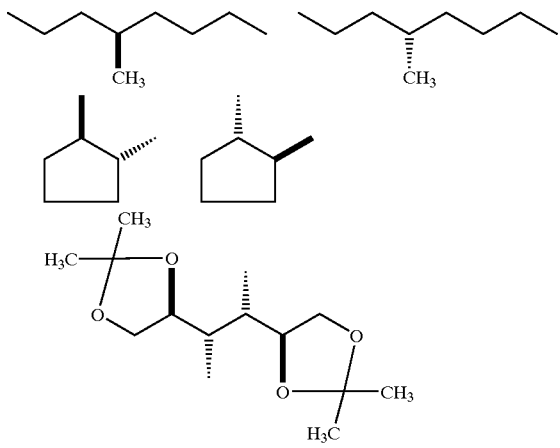

Further examples are set out in the German Application P 43 42 280.2.

n is preferably 2.

Preferred monomers of group a), furthermore, are chiral polymerizable cholesterol derivatives as are described in DE-A-35 35 547 and in U.S. Pat. No. 4,637,896, the full content of which is incorporated herein by reference.

Examples of preferred monomers of group b) are described in the dissertation by H. Jonsson, Department of Polymer Technology, Royal Institute of Technology, S-10044 Stockholm, Sweden, of Jan. 25, 1991, in DE-A-4 408 171, DE-A-4 408 170 and DE-A-4 405 316, the full content of which is incorporated herein by reference. The cholesteric mixture preferably comprises at least one achiral liquid-crystalline polymerizable monomer of the formula II $$Z^2\text{—}Y^4\text{—}A^2\text{—}Y^5\text{—}M^2\text{—}Y^6\text{—}A^3\text{—}Y^7\text{—}Z^3)_n \qquad (II)$$

where $Z^2,Z^3$ are identical or different polymerizable groups or radicals which contain a polymerizable group, n is 0 or 1

$Y^4,Y^5,Y^6,Y^7$ independently are chemical bonds, oxygen, sulfur,

—CO—O—, —O—CO—, —O—CO—O—,

—CO—S—, —S—CO—

—CO—N(R)—, —N(R)—CO—, $CH_2O$ or $OCH_2$ $A^2,A^3$ are identical or different spacers and $M^2$ is a mesogenic group.

The polymerizable groups, the bridges $Y^4$ to $Y^7$, the spacers and the mesogenic group are subject to the same preferences as the corresponding variables of the formula I.

In addition, the mixture of group b) includes a chiral compound. The chiral compound brings about the twisting of the achiral liquid-crystalline phase to form a cholesteric phase. In this context, the extent of twisting depends on the twisting power of the chiral dopant and on its concentration. Consequently, therefore, the pitch of the helix and, in turn, the reflection wavelength depend on the concentration of the chiral dopant. As a result, it is not possible to indicate a generally valid concentration range for the dopant. The dopant is added in the amount at which the desired reflection is produced.

Preferred chiral compounds are those of the formula Ia $$[Z^1\text{—}Y^1\text{—}A^1\text{—}^{Y2}\text{—}M^a\text{—}Y^3\text{—}]_n X \qquad (Ia),$$

where $Z^1$, $Y^1$, $Y^2$, $Y^3$, $A^1$, X and n are as defined above and $M^a$ is a divalent radical which comprises at least one heterocyclic or isocyclic ring system.

The moiety Ma here resembles the mesogenic groups described, since in this way a particularly good compatibility with the liquid-crystalline compound is achieved. $M^a$, however, need not be esogenic, since the compound Ia is intended to bring about an appropriate twisting of the liquid-crystalline phase merely by virtue of its chiral structure. Preferred ring systems present in a are the abovementioned structures T, preferred structures Ma being those of the abovementioned formula $(T\text{—}Y^8)_s\text{—}T$. Further monomers and chiral compounds of group b) are described in WO 97/00600 and its parent DE-A-195 324 08, the full content of which is incorporated herein by reference.

Preferred polymers of group c) are cholesteric cellulose derivatives as described in DE-A-197 136 38, especially cholesteric mixed esters of (VI) hydroxyalkyl ethers of cellulose with (VII) saturated, aliphatic or aromatic carboxylic acids and (VIII) unsaturated mono- or dicarboxylic acids.

Particular preference is given to mixed esters in which the hydroxyalkyl radicals of component VI that are attached by way of ether functions comprise straight-chain or branched $C_2$–$C_{10}$-hydroxyalkyl radicals, especially hydroxypropyl and/or hydroxyethyl radicals. Component VI of the suitable mixed esters preferably has a molecular weight of from about 500 to about 1 million. Preferably, the anhydroglucose units of the cellulose are etherified with hydroxyalkyl radicals in an average molar degree of substitution of from 2 to 4. The hydroxyalkyl groups in the cellulose can be identical or different. Up to 50% of them can also be replaced by alkyl groups (especially $C_1$–$C_{10}$-alkyl groups). One example of such a compound is hydroxypropyl-methylcellulose.

Compounds which can be used as component VII of the mixed esters that are employable are straight-chain aliphatic $C_1-C_{10}$ carboxylic acids, especially $C_2-C_6$ carboxylic acids, branched aliphatic $C_4-C_{10}$ carboxylic acids, especially $C_4-C_6$ carboxylic acids, or straight-chain or branched halocarboxylic acids. Component VII can also comprise benzoic acid or aliphatic carboxylic acids with aromatic substituents, especially phenylacetic acid. Component VII is selected with particular preference from acetic, propionic, n-butyric, isobutyric and n-valeric acid, in particular from propionic, 3-chloropropionic, n-butyric and isobutyric acid.

Component VIII is preferably selected from unsaturated $C_3-C_{12}$ mono- or dicarboxylic acids or monoesters of such a dicarboxylic acid, especially α,β-ethylenically unsaturated $C_3-C_6$ mono- or dicarboxylic acids or monoesters of the dicarboxylic acids.

With particular preference, component VIII of the employable mixed esters is selected from acrylic, methacrylic, crotonic, vinylacetic, maleic, fumaric and undecenoic acid, especially from acrylic and methacrylic acid.

Component VI is preferably esterified with component VII and VIII in an average degree of molar substitution of from 1.5 to 3, in articular from 1.6 to 2.7 and, with particular preference, from 2.3 to 2.6. Preferably about 1 to 30%, in particular from 1 to 20% or 1 to 10%, with particular preference from about 5 to 7%, of the OH groups of component VI are esterified with component VIII.

The proportion of component VII to component VIII determines the reflection wavelength of the polymer.

Highly suitable polymers of group c), moreover, are the propargyl-terminated cholesteric polyesters or polycarbonates described in DE-A-197 17 371.

Among these compounds, preference is given to polyesters or polycarbonates having at least one propargyl end group of the formula $R^3C{\equiv}C-CH_2-$, where $R^3$ is H, $C_1-C_4$-alkyl, aryl or Ar-$C_1-C_4$-alkyl (e.g. benzyl or phenethyl) which is attached to the polyesters or polycarbonates directly or via a linker. The linker is preferably selected from

where $R^4$ is H, $C_1-C_4$-alkyl or phenyl, X is O, S or $NR^2$ and $R^2$ is H, $C_1-C_4$-alkyl or phenyl.

In the polyesters the propargyl end group is preferably attached

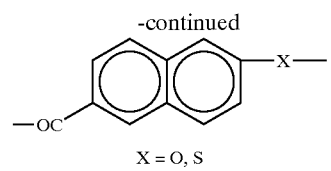

X = O, S

The polyesters preferably comprise (IX) at least one aromatic or araliphatic dicarboxylic acid unit and/or at least one aromatic or araliphatic hydroxy carboxylic acid unit and (X) at least one diol unit.

Preferred dicarboxylic acid units are those of the formula

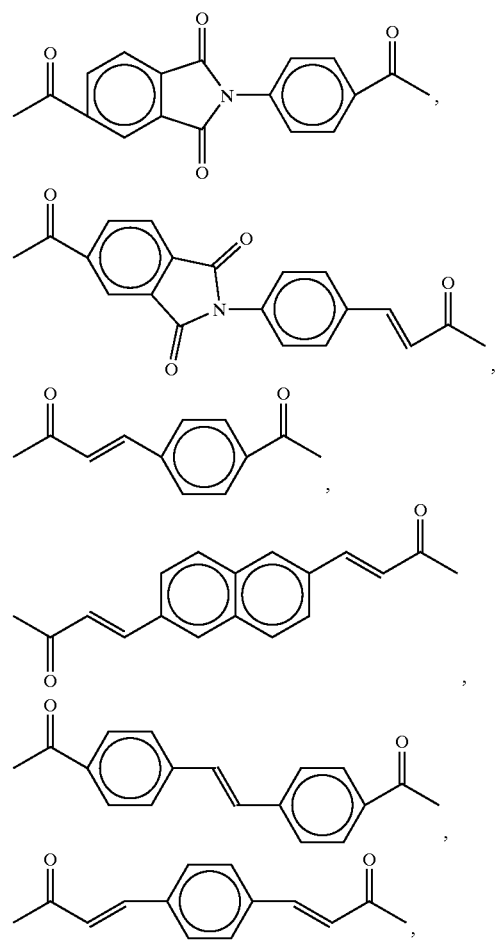

especially those of the formula

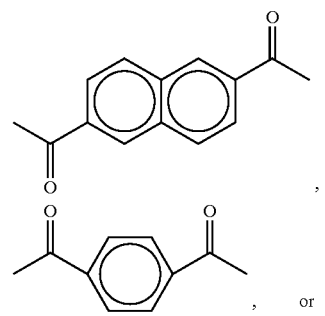

-continued

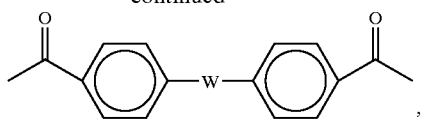

it being possible for each of the phenyl groups, or the naphthyl group, to contain 1, 2 or 3 substituents selected independently of one another from $C_1$–$C_4$-alkyl, $C_1$–$C_4$-alkoxy, halogen and phenyl and where, in the above formulae, W is NR, S, O, $(CH_2)_pO(CH_2)_q$, $(CH_2)_m$ or a single bond,
R is alkyl or hydrogen,
m is an integer from 1 to 15 and
p and q independently are integers from 0 to 10.

Preferred hydroxy carboxylic acid units are those of the formula

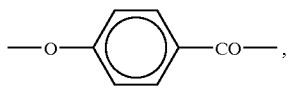

and

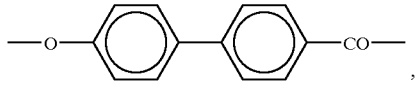

where each phenyl group or the naphthyl group can have 1, 2 or 3 substituents selected independently of one another from $C_1$–$C_4$-alkyl, $C_1$–$C_4$-alkoxy, halogen and phenyl.

Preferred diol units are those of the formula

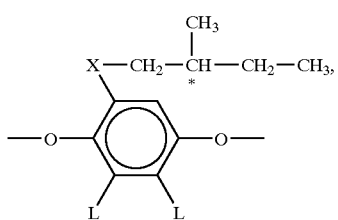

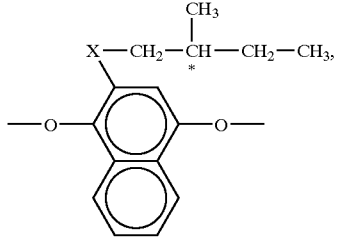

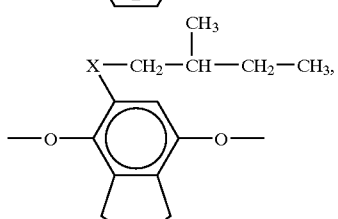

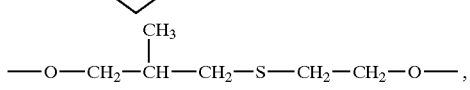

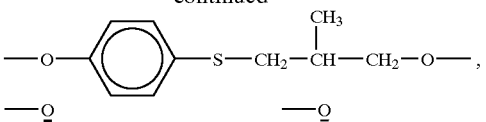

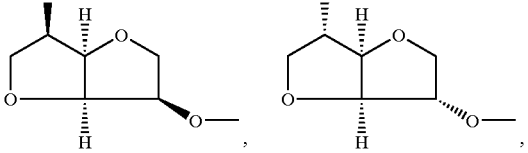

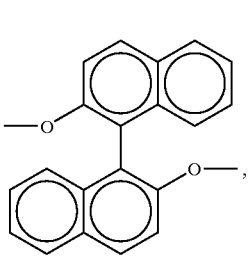

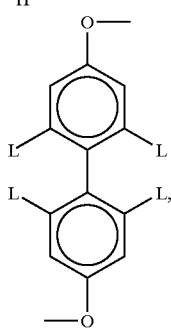

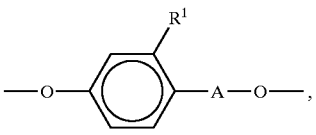

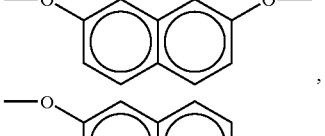

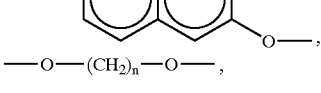

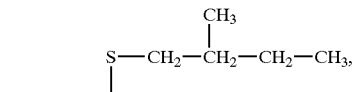

especially those of the formula

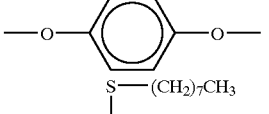

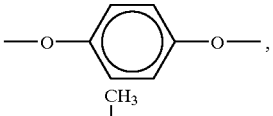

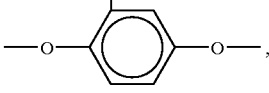

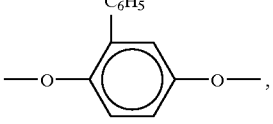

-continued

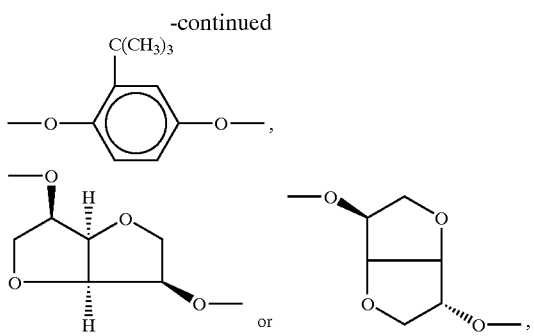

where, in the above formulae,

L is alkyl, alkoxy, halogen, COOR, OCOR, CONHR or NECOR,

X is S, O, N, $CH_2$ or a single bond,

A is a single bond, $(CH_2)_n$, $O(CH_2)_n$, $S(CH_2)_n$, $NR(CH_2)_n$,

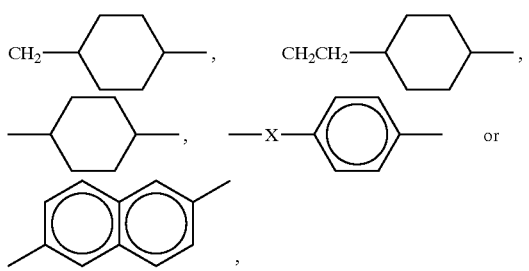

R is alkyl or hydrogen, $R^1$ is hydrogen, halogen, alkyl or phenyl and n is an integer from 1 to 15.

Preference is given to polyesters comprising at least one dicarboxylic acid unit of the formula

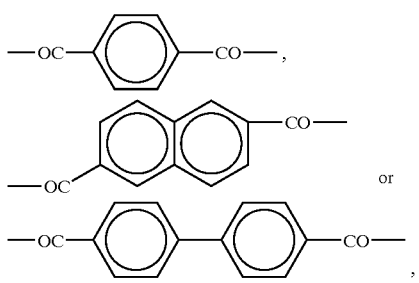

and at least one diol unit of the formula

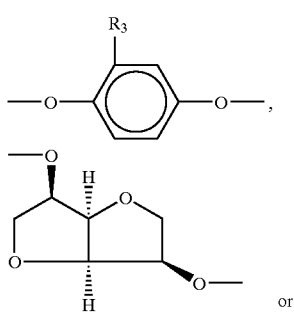

-continued

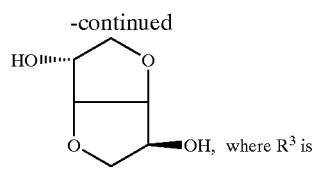, where $R^3$ is

H, halogen, $C_1$–$C_4$-alkyl, especially $CH_3$ or $C(CH_3)_3$, or phenyl.

Further preferred compounds are diesters of the formula P-Y-B-CO-O-A-O-CO-B-Y-P, where P is a propargyl end group of the above-defined formula, Y is O, S or $NR^2$ ($R^2$=$C_1$–$C_4$-alkyl), B is

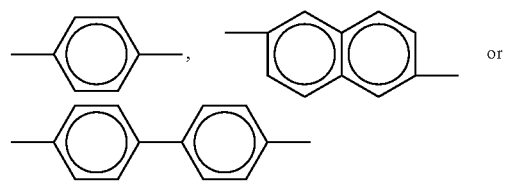

where each phenyl group or the naphthyl group can have 1, 2 or 3 substituents selected independently of one another from $C_1$–$C_4$-alkyl, $C_1$–$C_4$-alkoxy, halogen and phenyl, and A (together with the adjacent oxygen atoms) is one of the abovementioned diol units.

Particularly preferred diesters are those of the abovementioned formula in which B is

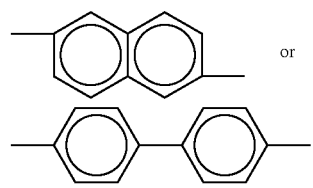

and especially diesters of the formula $$HC{\equiv}CCH_2O-B-CO-O-A-O-CO-B-OCH_2-C{\equiv}CH,$$
where B is (XI)

and

A is

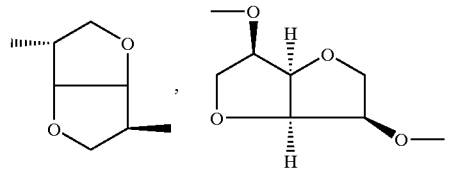

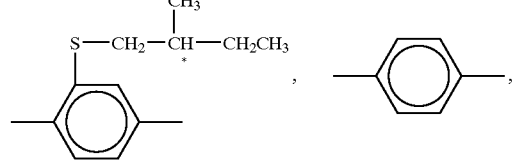

-continued

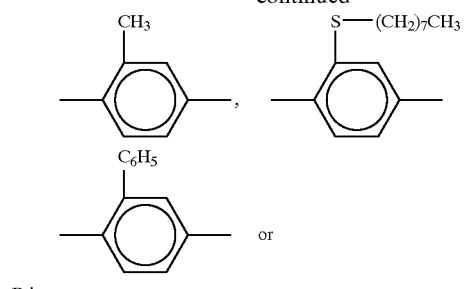

B is

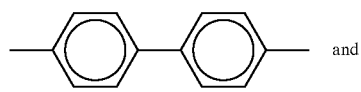

Further preferred compounds are polycarbonates comprising at least one incorporated diol unit of the abovementioned formulae, espcially of the formulae

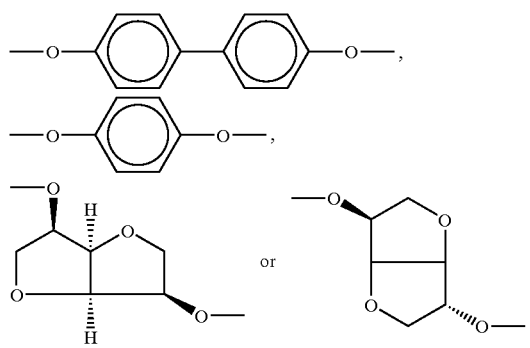

Preference is given here to those polycarbonates which comprise as diol units at least one mesogenic unit of the formula

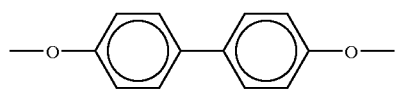

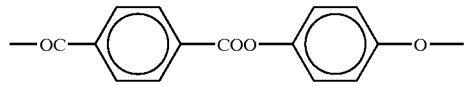 and at least one chiral unit of the formula

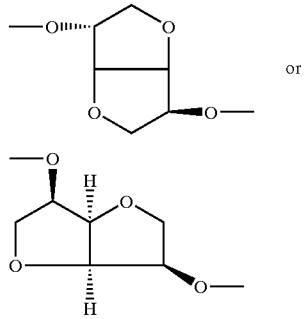

(XII)

with or without a non-chiral unit of the formula

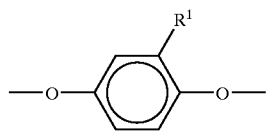

$R^1$ being as defined above and in particular being H or $CH_3$.

Particularly preferred polycarbonates are those having propargyl end groups of the formula $HC{\equiv}CCH_2O-R^5-CO$, where $R^5$ is

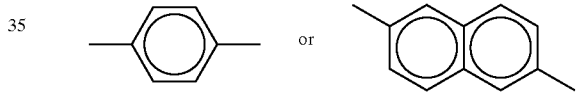

Further suitable polymers of group c) are cholesteric polycarbonates containing photoreactive groups even in a non-terminal position. Such polycarbonates are described in DE-A-196 31 658 and are preferably of the formula XIII

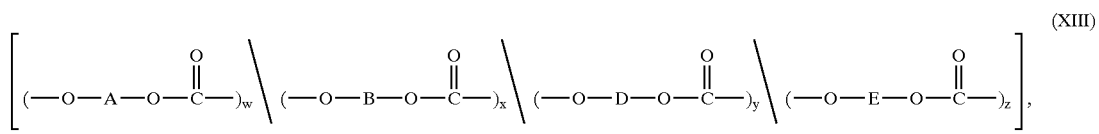

(XIII)

where the molar ratio w/x/y/z is from about 1 to 20/from about 1 to 5/from about 0 to 10/from about 0 to 10, particularly preferably from about 1 to 5/from about 1 to 2/from about 0 to 5/from about 0 to 5.

In the formula XIII

A is a mesogenic group of the formula

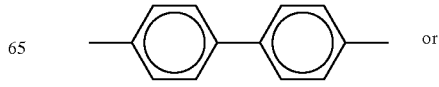 or

-continued

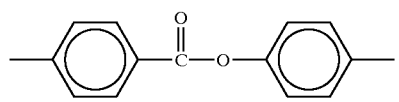

B is a chiral group of the formula

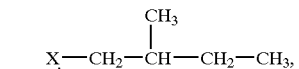

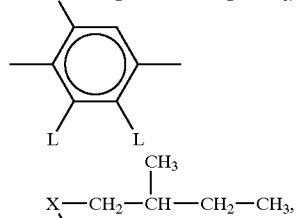

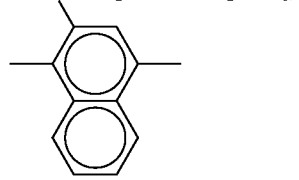

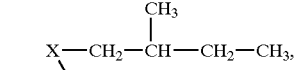

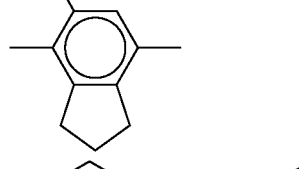

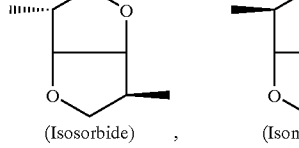

D is a photoreactive group of the formula

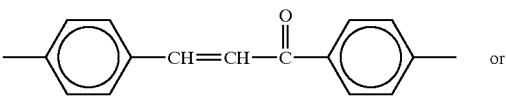

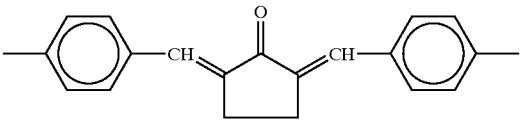

and
E is a further, non-chiral group of the formula

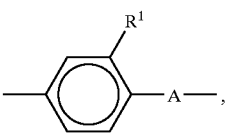

where, in the above formulae,
L is alkyl, alkoxy, halogen, COOR, OCOR, CONHR or NHCOR,
X is S, O, N, $CH_2$ or a single bond,
R is alkyl or hydrogen,
A is a single bond, $(CH_2)_n$, $O(CH_2)_n$, $S(Cu_2)_n$, $NR(CH_2)_n$,

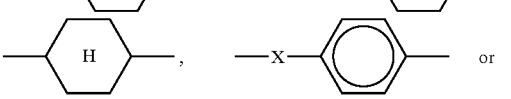

$R^1$ is hydrogen, halogen, alkyl or phenyl and
n is an integer from 1 to 15.
If $R_1$ is alkyl or halogen and A is a single bond, or if $R^1$ is H or alkyl and A is

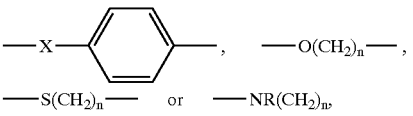

the groups are solubility-improving groups. Examples thereof are

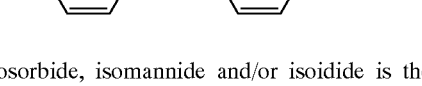

Isosorbide, isomannide and/or isoidide is the preferred chiral component.
The proportion of the chiral diol structural units is preferably within the range from 1 to 80 mol-% of the overall content of diol structural units, with particular preference from 2 to 20 mol-%, depending on the desired reflection behavior.

Examples of preferred polymers of group d) are crosslinkable cholesteric copolyisocyanates as described in U.S. Pat. No. 5,847,068, the full content of which is incorporated herein by reference. Such copolyisocyanates have repeating units of the formulae

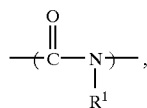
(III)

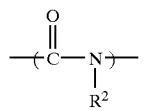
(IV)

and, if appropriate, of the formula

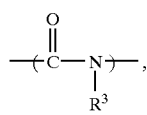
(V)

where
$R^1$ is a chiral aliphatic or aromatic radical,
$R^2$ is a crosslinkable radical and
$R^3$ is an achiral radical.

Unless specified otherwise alkyl here (including definitions such as alkoxy, dialkyl, alkylthio, etc.) means a branched or unbranched $C_1$–$C_{12}$-alkyl, preferably $C_3$–$C_{12}$-alkyl, with particular preference $C_4$–$C_{10}$-alkyl and, in particular, $C_6$–$C_{10}$-alkyl.

$R^1$ is selected preferably from (chiral) branched or unbranched alkyl, alkoxyalkyl, alkylthioalkyl, cycloalkyl, alkylphenyl or $C_3$–$C_9$-epoxyalkyl radicals or radicals of esters of $C_1$–$C_6$ fatty acids with $C_1$–$C_6$-alkanols or $C_3$–$C_6$-dialkyl ketones. The ester radical can be attached to the nitrogen either by way of the fatty acid component or by way of the alkanol radical. The radical $R^1$ can have 1, 2 or 3 substituents which are identical or different and are selected from alkoxy, di-$C_1$–$C_4$-alkylamino, CN, halogen or $C_1$–$C_4$-alkylthio groups.

$R^1$ is preferably selected from alkyl, alkoxyalkyl, radicals of esters of $C_1$–$C_6$ fatty acids with $C_1$–$C_6$-alkanols, $C_3$–$C_6$-dialkyl ketones and epoxidized $C_3$–$C_6$-epoxyalkyl radicals, where $R^1$ can be substituted by 1 or 2 radicals which are identical or different and are selected from alkoxy, halogen, CN and $CF_3$. Preferred substituents of branched or unbranched alkyl or alkoxy radicals are selected from alkoxy groups, halogen atoms or CN; for esters of $C_1$–$C_6$ fatty acids with $C_1$–$C_6$-alkanols, from alkoxy groups, halogen atoms, CN and $CF_3$, and for $C_3$–$C_6$-dialkyl ketones from alkoxy groups, halogen atoms and CN.

The main chain of the radical $R^1$ has a length in particular of from 3 to 12, especially from 6 to 10 and, preferably, from 6 to 8 members (carbons, oxygens and/or sulfur atoms). Particular preference is given to radicals $R^1$ selected from

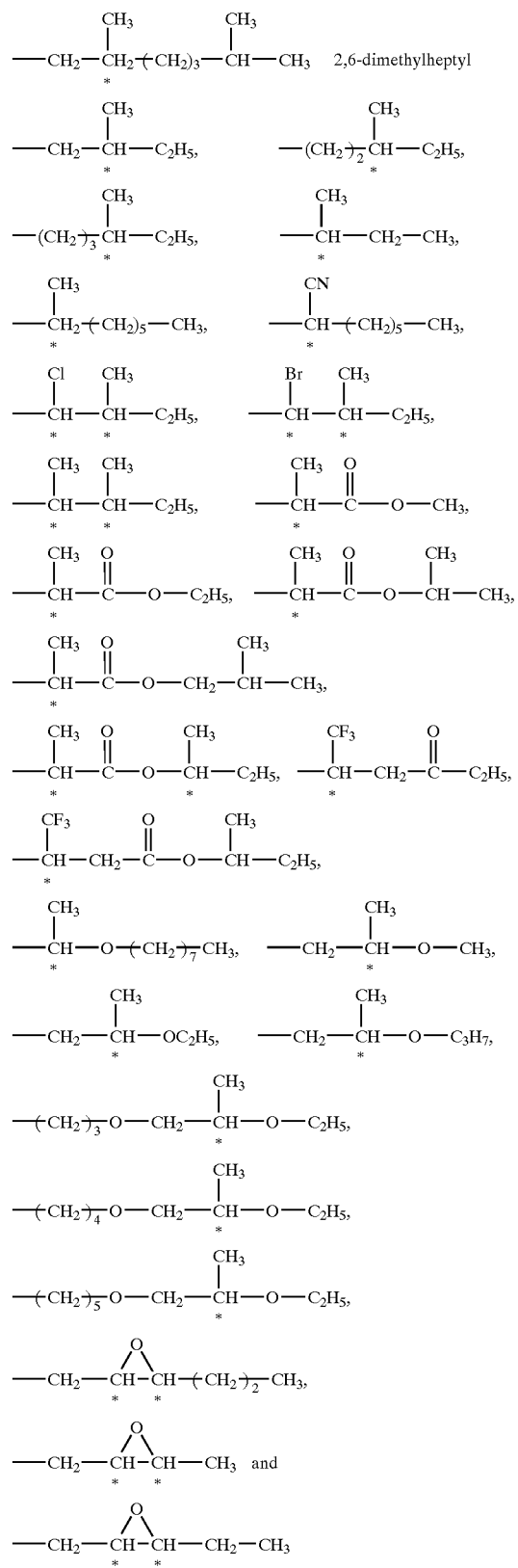

With very particular preference, component III of the copolyisocyanates that can be employed is derived from 2,6-dimethylheptyl isocyanate.

The radical $R^2$ of the copolyisocyanates that can be employed is preferably selected from $C_3$–$C_{11}$-alkenyl radicals, $C_4$–$C_{11}$-vinyl ether radiclas (=vinyl $C_2$–$C_9$-alkyl ethers), ethylenically unsaturated $C_3$–$C_{11}$ carboxylic acid radicals and esters of ethylenically unsaturated $C_3$–$C_6$ monocarboxylic acids with $C_2$–$C_6$-alkanols, the bond to the nitrogen atom being by way of the alkanol radical of the ester with particular preference the radical is selected from methyl, ethyl, propyl, n-butyl, isobutyl and 2-ethylhexyl acrylate and from methyl, ethyl, propyl, n-butyl, isobutyl and 2-ethylhexyl methacrylate, in particular from ethyl acrylate and ethyl methacrylate.

The radical $R^3$ preferably has the same meanings as the radical $R^1$. However, it is achiral—in other words, it has no center of chirality, or is present as a racemic mixture.

With particular preference, the main chain of the radical $R^3$ has a length from 4 to 12, in particular from 6 to 10 and, preferably, from 6 to 8 members (carbon, oxygen and/or sulfur atoms). With very particular preference, component V of the copolyisocyanates of the invention is derived from n-hexyl, n-heptyl or n-octyl isocyanate.

Components III, IV and v are preferably present in a molar ratio III:IV:V of from about 1 to 20:1 to 20:50 to 98, in particular from about 5 to 15:5 to 15:65 to 90 and, with particular preference, about 15:10:75.

The units III, IV and V can be in random distribution within the copolyisocyanates that can be employed.

Suitable polymers of group e) are chiral nematic polyesters having flexible chains, which comprise isosorbide, isomannide and/or isoidide units, preferably isosorbide units, and for chain flexibilization comprise at least one unit selected from (and derived from)
(a) aliphatic dicarboxylic acids,
(b) aromatic dicarboxylic acids with a flexible spacer,
(c) α, ω-alkanediols,
(d) diphenols with a flexible spacer and
(e) condensation products of a polyalkylene terephthalate or polyalkylene naphthalate with an acylated diphenol and an acylated isosorbide,
as are described in DE-A-197 04 506.

The polyesters are noncrystalline and form stable cholesteric phases which can be frozen in on cooling to below the glass transition temperature. The glass transition temperatures of the polyesters, in turn, despite the flexibilization are above 80° C., preferably above 90° C. and, in particular, above 100° C.

The polyesters that can be employed include as units (a) preferably those of the formula

where n is 3 to 15, especially 4 to 12, and with particular preference adipic acid;
as units (b) preferably those of the formula

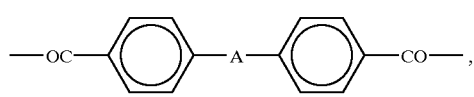

where
A is $(CH_2)_n$, $O(CH_2)_nO$ or $(CH_2)_o$—O—$(CH_2)_p$,
n is 3 to 15, especially 4 to 12 and, with particular preference, 4 to 10, and
o and p independently are from 1 to 7;
as units (c) preferably those of the formula

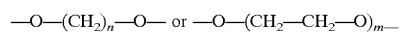

where
n is 3 to 15, especially 4 to 12 and, with particular preference, 4 to 10, and
m is 1 to 10; and
as units (d) preferably those of the formula

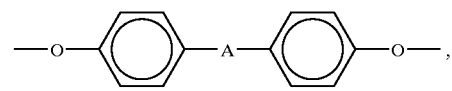

where
A is $(CH_2)_n$, $O(CH_2)_nO$ or $(CH_2)_o$—O—$(CH_2)_p$,
n is 3 to 15, especially 4 to 12 and, with particular preference, 4 to 10, and
o and p independently are 1 to 7.

The polyesters that can be employed comprise additionally, as nonflexible acid component, preferably dicarboxylic acid units of the formula

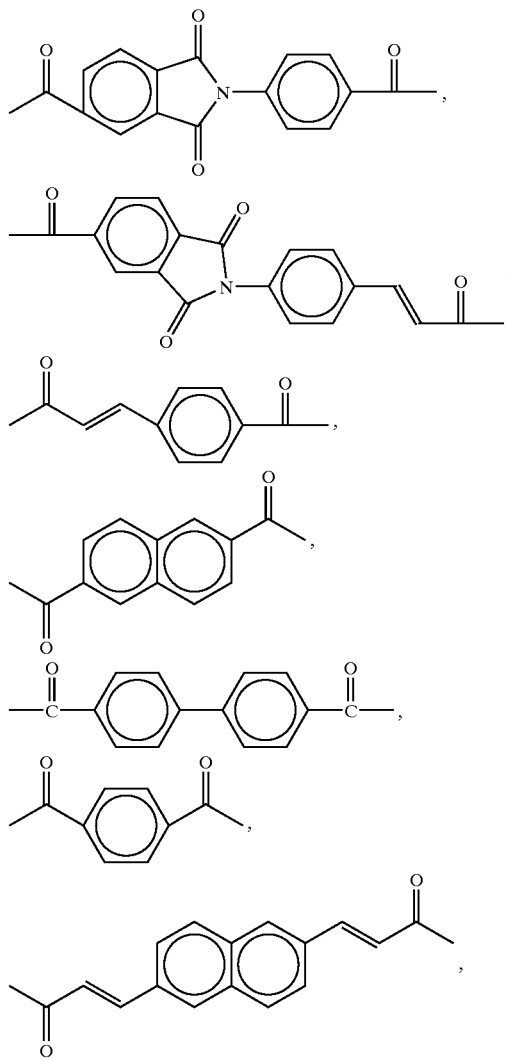

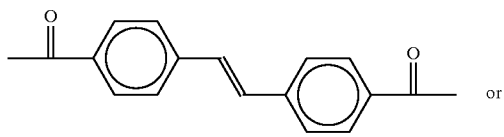

or

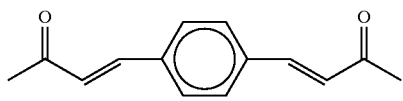

and as nonflexible alcohol component diol units of the formula

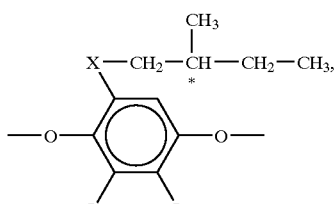

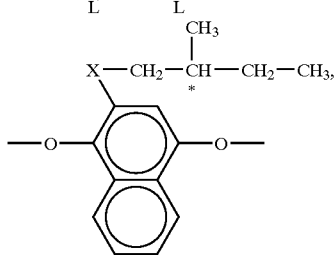

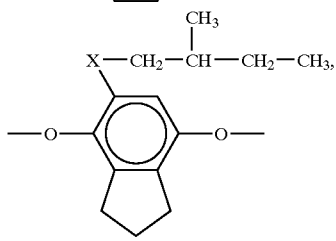

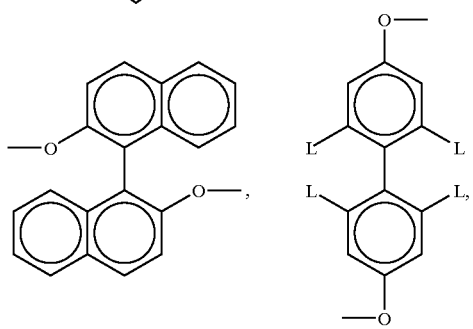

or

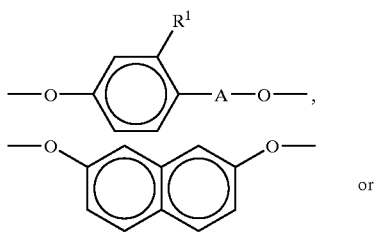

where, in the above formulae,

L is alkyl, alkoxy, halogen, COOR, OCOR, CONHR or NHCOR,

X is S, O, N, CH$_2$ or a single bond,

A is a single bond, and where

R$^1$ is hydrogen, halogen, alkyl or phenyl and

R is alkyl or hydrogen.

The polyesters that can be employed may include additional flexible diol units of the formula R$^1$ is hydrogen, halogen, alkyl or phenyl, A is (CH$_2$)$_n$, O(CH$_2$)$_n$, S(CH$_2$)$_n$ or NR(CH$_2$)$_n$, and n is 1 to 15.

Examples of preferred polymers of group f) are crosslinkable liquid-crystalline polyorganosiloxanes as are described in EP-A-066 137 and in EP-A-358 208. The mixture of group f) additionally comprises a chiral compound. Suitable chiral compounds are, in particular, the chiral dopants of the formula Ia described for the mixtures of group b).

With very particular preference, the heat-insulating coating of the invention comprises chiral compounds and nematic monomers of group b), especially chiral compounds of the formula 2:

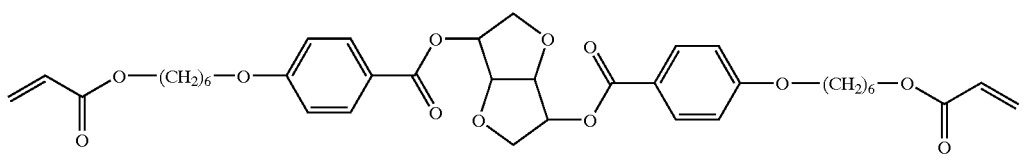

(2)

and/or of the formula 5:

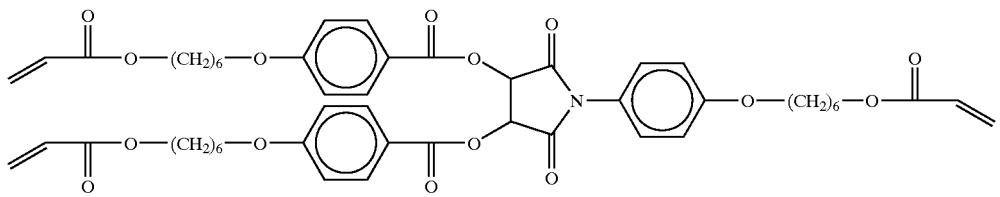

(5)

and nematic monomers of the formula 1:

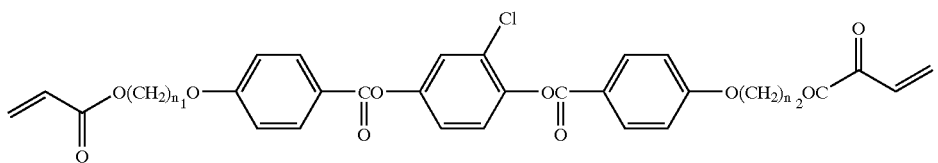

(1)

of the formula 3:

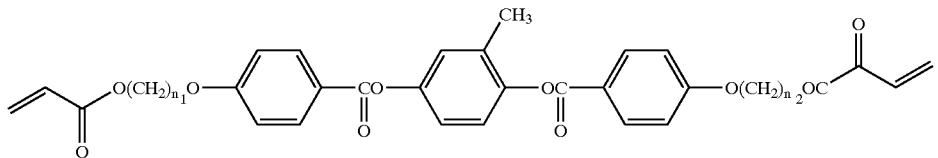

(3)

or of the formula 4:

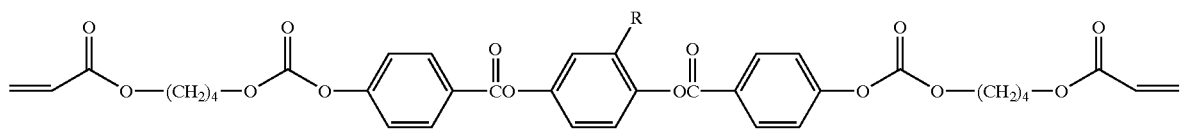

(4)

in the cured state, where $n^1$ and $n_2$ in the formulae 1 and 3 are independently 2, 4 or 6 and the monomers of the formula 1 or 3 are preferably employed as mixtures of compounds with $n_1/n_2$=2/4, 2/6, 4/2, 6/2, 4/4, 4/6, 6/4 or 6/6, and R in formula 4 is H, Cl or $CH_3$.

The present invention additionally provides a process for producing a heat-insulating coating, which comprises applying to a transparent substrate at least one cholesteric IR-reflecting layer, curing it, applying, if desired, one or more further cholesteric IR-reflecting layers and, if desired, a medium which reverses the direction of rotation of the transmitted circularly polarized light, curing said layer(s) and so completing the heat-insulating coating.

The transparent substrate to which the IR-reflecting layer(s) is(are) applied can be, for example, a glazed unit, a window pane or a film which is to be bonded adhesively to a window pane for insulation purposes.

The cholesteric IR-reflecting layer can be applied to the substrate by customary techniques: for example, by means of techniques selected from air knife coating, bar coating, squeeze coating, impregnating, reverse roll coating, transfer roll coating, gravure coating, kiss coating, casting, spraying, spin coating or printing techniques, such as letterpress, flexographic, intaglio, offset or screen printing.

The IR-reflecting layer(s) can be applied in the form of low-gap or high-viscosity mixtures to the substrate, but preferably as low-viscosity mixtures. To this end the cholesteric mixtures can be applied to the substrate in undiluted or minimally diluted form at an elevated temperature or in highly diluted form at a low temperature.

The cholesteric mixtures and the formulations comprising absorption pigments can be diluted with any suitable diluent prior to their application to the substrate.

Examples of diluents which can be employed in the process of the invention for the compounds of groups a) or b) are linear or branched esters, especially acetic esters, cyclic ethers and esters, alcohols, lactones, aliphatic and aromatic hydrocarbons, such as toluene, xylene and cyclohexane, and also ketones, amides, N-alkylpyrrolidones, especially N-methylpyrrolidone, and, in particular, tetrahydrofuran (THF), dioxane and methyl ethyl ketone (MEK).

Examples of suitable diluents for the polymers of group c) are ethers and cyclic ethers such as tetrahydrofuran or dioxane, chlorinated hydrocarbons such as dichloromethane, 1,1,2,2-tetrachloroethane, 1-chloronaphthalene, chlorobenzene or 1,2-dichlorobenzene. These diluents are particularly suitable for polyesters and polycarbonates. Examples of suitable diluents for ellulose derivatives are ethers, such as dioxane, or ketones, such as acetone. Where copolyisocyanates are employed as polymers of group d) it is advisable to use polymerizable diluents as described in U.S. Pat. No. 5,847,068. Examples of such polymerizable diluents are esters of $\alpha,\beta$-unsaturated mono- or dicarboxylic acids, especially $C_3$–$C_6$ mono- or dicarboxylic acids, with $C_1$–$C_{12}$-alkanols, $C_2$–$C_{12}$-alkanediols or their $C_1$–$C_6$-alkyl ethers and phenyl ethers, examples being acrylates and methacrylates, hydroxyethyl or hydroxypropyl acrylate or methacrylate, and 2-ethoxyethyl acrylate or methacrylate;

vinyl $C_1$–$C_{12}$-alkyl ethers, such as vinyl ethyl, hexyl or octyl ether;

vinyl esters of $C_1$–$C_{12}$ carboxylic acids, such as vinyl acetate, propionate or laurate;

$C_3$–$C_9$ epoxides, such as 1,2-butylene oxide, styrene oxide;

N-vinylpyrrolidone, N-vinylcaprolactam, N-vinylformamide;

vinylaromatic compounds, such as styrene, $\alpha$-methylstyrene, chlorostyrene, and compounds having two or more crosslinkable groups, such as diesters of diols (including polyethylene glycols) with acrylic or methacrylic acid or divinylbenzene.

Examples of preferred polymerizable diluents are 2-ethoxyethyl acrylate, diethylene glycol diacrylate, ethylene glycol dimethacrylate, diethylene glycol dimethacrylate, triethylene glycol dimethacrylate, diethylene glycol monomethyl ether acrylate, phenoxyethyl acrylate and tetraethylene glycol dimethacrylate. A particularly preferred polymerizable diluent is styrene.

The mixtures of groups a), b) or c) may also include polymerizable diluents in small amounts. Preferred polymerizable solvents which can be added to a), b) or c) are acrylates, especially acrylates of relatively high functionality such as bis-, tris- or tetraacrylates and, with particular preference, high-boiling oligoacrylates. The preferred amount added is approximately 5% by weight, based on the overall weight of the mixture.

For photochemical polymerization, the cholesteric mixture may include customary commercial photoinitiators. For curing by electron beams, such initiators are not required. Examples of suitable photoinitiators are isobutyl benzoin ether, 2,4,6-trimethylbenzoyldiphenylphosphine oxide, 1-hydroxycyclohexyl phenyl ketone, 2-benzyl-2-dimethylamino-1-(4-morpholinophenyl)-furan-1-one, mixtures of benzophenone and 1-hydroxycyclohexyl phenyl ketone, 2,2-dimethoxy-2-phenylacetophenone, perfluorinated diphenyltitanocenes, 2-methyl-1-(4-Cmethylthiolphenyl)-2-(4-morpholinyl)-1-propanone, 2-hydroxy-2-methyl-1-phenylpropan-1-one, 4-(2-hydroxyethoxy)phenyl 2-hydroxy-2-propyl ketone, 2,2-diethoxyacetophenone, 4-benzoyl-4'-methyldiphenyl sulfide, ethyl 4-(dimethylamino)benzoate, mixtures of tip 2-isopropylthioxanthone and 4-isopropylthioxanthone, 2-(dimethylamino)ethyl benzoate, d,l-camphorquinone, ethyl-d,l-camphorquinone, mixtures of benzophenone and 4-methylbenzophenone, benzophenone, 4,4'-bisdimethylaminebenzophenone, ($\eta^5$-cyclopentadienyl)($\eta^6$-isopropylphenyl)iron(II) hexafluorophosphate, triphenylsulfonium hexafluorophosphate or mixtures of triphenylsulfonium salts, and butanediol diacrylate, dipropylene glycol diacrylate, hexanediol diacrylate, 4-(1,1-dimethylethyl)cyclohexyl acrylate, trimethylolpropane triacrylate and tripropylene glycol diacrylate.

In order to adjust the viscosity and the leveling behavior it is possible for the cholesteric mixtures to be mixed with additional components.

For example, it is possible to employ polymeric binders and/or monomeric compounds which can be converted into a polymeric binder by polymerization. Examples of suitable such compounds are organic-solvent-soluble polyesters, cellulose esters, polyurethanes and silicones, including polyether- or polyester-modified silicones. It is particularly preferred to employ cellulose esters such as cellulose acetobutyrate.

The addition of small amounts of suitable leveling agents may also be advantageous. It is possible to employ from about 0.005 to 1% by weight, in particular from 0.01 to 0.5% by weight, based on the amount of cholesteric employed. Examples of suitable leveling agents are glycols, silicone oils and, in particular, acrylate polymers, such as the acrylate copolymers obtainable under the name Byk 361 or Byk 358 from Byk-Chemie and the modified, silicone-free acrylate polymers obtainable under the name Tego flow ZFS 460 from Tego.

The cholesteric mixture may also include stabilizers to counter the effects of UV and weather. Examples of suitable such additives are derivatives of 2,4-dihydroxybenzophenone, derivatives of 2-cyano-3,3-diphenyl acrylate, derivatives of 2,2', 4,4'-tetrahydroxybenzophenone, derivatives of ortho-hydroxyphenylbenzotriazole, salicylic esters, ortho-hydroxyphenyl-s-triazines or sterically hindered amines. These substances can be employed alone or, preferably, as mixtures.

The IR-reflecting layer(s) applied can be cured thermally, photochemically or by a beam of electrons.

Curing must of course take place in the cholesteric phase and with retention of the cholesteric phase.

Where two or more layers are applied, they can in each case be applied, dried—if desired—and cured individually. However, it is likewise possible to apply two or more, or all, of the layers to be applied in one application procedure, wet-on-wet, to the article that is to be coated, to carry out conjoint drying if desired and then to carry out conjoint curing. A prerequisite for the simultaneous application of the cholesteric layers, however, is that there is no interdiffusion between different layers having a different reflection behavior.

Casting techniques are particularly suitable for the simultaneous application of cholesteric layers, especially knife or bar casting techniques, cast-film extrusion or stripper casting techniques, and the cascade casting process. These casting techniques are described, for example, in DE-A-19 504 930, EP-A-431 630, DE-A-3 733 031 and EP-A-452 959, which are expressly incorporated herein by reference.

The present invention additionally provides a multicomponent coating system comprising components which are capable of forming cholesteric layers having mutually different reflection maxima in the wavelength range >750 nm. By means of such a coating system of the invention, whose components can be employed, for example, as coating formulations, it is possible to provide any-desired substrate with a heat-insulating coating of the invention.

The heat-insulating coating of the invention is particularly suitable for producing insulated windows or heat-insulating transparent construction materials, or for insulating residential, office or industrial buildings against thermal radiation. In addition, the heat-insulating coating of the invention is also particularly suitable for use in the automotive sector, especially for producing heat-insulating laminated glass screens. Its use for these purposes is therefore also provided for by the present invention.

The Examples which follow illustrate the invention without limiting it to them.

Examples 1 to 3 used a nematic liquid-crystalline mixture of the formula 1 which is present up to 5° C. in the smectic phase, up to 68° C. in the nematic phase and above 68° C. in the isotropic phase (S 5 N 68 I).

The chiral dopant employed in Examples 1 and 2 was the compound of the formula 2 and in Example 3 the compound of the formula 5.

Cellulose acetobutyrate in a concentration of 0.8% by weight based on the cholesteric mixture was added to the mixtures employed in Examples 1 to 3 in order to improve layering, and the overall mixture was dissolved in butyl acetate. 2,4,6-Trimethylbenzoyldiphenylphosphine oxide as photoinitiator was added in a concentration of 1.5% by weight, based on the cholesteric mixture. This mixture was applied with a doctor blade in a wet-film thickness of 30 $\mu$m to a glass plate. In all three examples, a homogeneous transparent layer was formed in each case following the evaporation of the solvent. This layer was crosslinked photochemically using a UV light source.

Example 1

Five cholesteric layers were each applied individually and cured as described above. The compositions of the cholesteric layers differed in terms of the concentration of the ingredients, as shown in the following Table 1:

| Layer | $x_{ch}$ | $x_n$ | $\lambda_R$ |
|---|---|---|---|
| 1 | 0.032 | 0.968 | 220 |
| 2 | 0.027 | 0.973 | 943 |
| 3 | 0.024 | 0.976 | 1085 |
| 4 | 0.021 | 0.979 | 1250 |
| 5 | 0.018 | 0.982 | 1440 |

In addition, all layers contained cellulose acetobutyrate and 2,4,6-trimethylbenzoyldiphenylphosphine oxide in the amounts indicated above.

The concentration of the chiral component is abbreviated to $X_{ch}$ and is indicated as a molar fraction. The concentration of the nematic component is abbreviated to $x_n$ and likewise indicated as a molar fraction. $\lambda_R$ indicates the wavelength of the reflection maximum in nm.

The layers applied atop one another gave a reflection of 47% of the incident light in the wavelength range between 752 and 1500 nm. The transparency in the visible wavelength range (between 400 and 700 nm) was more than 95%.

Example 2

Example 2 was carried out using the mixture present in layer 1 of Example 1. As indicated above this mixture was applied to two glass plates with a doctor blade which applies a wet-film thickness of 30 $\mu$m, the solvent was stripped off, and the resulting transparent film was cured photochemically by means of a UV light source (Nitraphot lamp from OSRAM). Then a $\lambda/2$ film (from Nitto) was placed between the coated glass plates in such a way that the liquid-crystalline layers were in contact with the $\lambda/2$ film. The optical behavior of this arrangement was examined spectroscopically. It was found that the coating comprising the $\lambda/2$ film had a degree of reflection of 89% in the wavelength range from 752 to 880 nm and a transmission in the visible wavelength range of more than 93%.

Example 3

Using a doctor blade, two layers were applied individually atop one another in succession with a wet-film thickness of in each case 30 $\mu$m, the solvent was stripped off and the resulting film, which is about 16 $\mu$m thick and is transparent in the visible range, was cured photochemically with the light source indicated above. The two overlying layers were identical in their material composition; they both contained 13 molar parts of cholesteric to 87 molar parts of the nematic compound as well as cellulose acetobutyrate and 2,4,6-trimethylbenzoyldiphenylphosphine oxide in the amounts indicated above. The wavelength of the reflection maximum for both layers was 820 nm. The layers differed, however, in their handedness; the helical structure of one layer was right-handed, that of the other layer left-handed. Spectroscopic investigations showed a selective reflection of 94% at a wavelength of 820 nm. The mid-peak width of the reflection was 121 nm. The transmission in the visible wavelength range was more than 93%.

We claim:

1. A heat-insulating coating, comprising:

one or more non-micellar cholesteric layers, each reflecting at least 40% of ambient incident radiation in the infrared wavelength range above 750 nm.

2. The heat-insulating coating as claimed in claim 1, which transmits at least 80% of the incident radiation in the wavelength range from about 390 nm to 750 nm.

3. The heat-insulating coating as claimed in claim 1, which comprises two or more cholesteric IR-reflecting layers.

4. The heat-insulating coating as claimed in claim 3, whose cholesteric layers have mutually different reflection maxima in the wavelength range >750 nm.

5. The heat-insulating coating as claimed in claim 1, which comprises two or more cholesteric layers, the pitch of the helical superstructures of 2 layers in each case being identical but their handedness being different.

6. The heat-insulating coating as claimed in claim 1, which between layers having a helical superstructure of identical pitch and identical handedness has a medium which reverses the direction of rotation of the transmitted circularly polarized light.

7. The heat-insulating coating as claimed in claim 6, which reflects at least 75% of the incident radiation in the wavelength range above 750 nm.

8. The heat-insulating coating as claimed in claim 1, which in the cured state comprises cholesteric compounds or mixtures of compounds selected from the group consisting of
   a) at least one cholesteric polymerizable monomer;
   b) at least one achiral, nematic, polymerizable monomer and a chiral compound;
   c) at least one cholesteric crosslinkable polymer;
   d) at least one cholesteric polymer in a polymerizable diluent or a mixture of polymerizable diluents;
   e) at least one cholesteric polymer whose cholesteric phase can be frozen in by rapid cooling to below the glass transition temperature; or
   f) at least one achiral, liquid-crystalline crosslinkable polymer and a chiral compound.

9. The process for producing a heat-insulating coating as claimed in claim 1, which comprises:
   applying to a transparent substrate at least one cholesteric IR-reflecting layer, curing the layer, applying one or more additional cholesteric IR-reflecting layers and a medium which reverses the direction of rotation of the transmitted circularly polarized light and curing said layer(s), thereby completing the heat-insulating coating.

10. A multicomponent coating system, comprising: components capable of forming cholesteric layers in accordance with the definition of claim 4.

11. A heat-insulating coating as claimed in claim 1 for producing insulating windows or heat-insulating transparent construction materials or for insulating residential, office or industrial buildings.

12. A heat-insulating coating as claimed in claim 1 for use in the automotive sector, especially for producing heat-insulating laminated glass screens.

13. A film, comprising a heat-insulating coating as claimed in claim 1.

14. The film as claimed in claim 13, which is an adhesive film.

15. The heat-insulating coating as claimed in claim 1, which is a stack of five reflecting layers having successive light reflecting maxima of 220 nm, 943 nm, 1085 nm, 1250 nm and 1440 nm, thereby providing a coating having an incident light reflection of 47% in the wavelength range of 752 to 1500 nm but having a transparency to visible light of more than 95%.

16. The heat-insulating coating as claimed in claim 12, which is constructed of two layers of the same light reflecting mixture that reflects light of a wavelength of 220 nm, the layers separated by an intervening $\lambda/2$ film, thereby providing a coating that has a degree of reflection of 89% in the wavelength range of 752 to 880 nm and a transmission of visible light of more than 93%.

17. The heat-insulating coating as claimed in claim 1, wherein the heat reflecting coating is constructed of two layers of a light reflecting mixture of a cholesteric compound and a nematic compound having a light reflecting maximum of 820 nm, the two layers differing by having different handedness, and exhibiting a selective reflection of light at a wavelength of 820 nm while passing visible light to an extent of greater than 93%.

* * * * *